United States Patent

[11] 3,552,514

| [72] | Inventor | James R. Alpers<br>Rte. 5, Box 482B, Blair Township, Grand Traverse County, Traverse City, Mich. 49684 |
|---|---|---|
| [21] | Appl. No. | 757,930 |
| [22] | Filed | Sept. 6, 1968 |
| [45] | Patented | Jan. 5, 1971 |

[54] RETICULAR SHIELD FOR VEHICLES
4 Claims, 5 Drawing Figs.

[52] U.S. Cl. .................................................. 180/5, 280/150, 293/60, 293/64
[51] Int. Cl. ..................................................... B60r 19/00
[50] Field of Search ............................................. 180/5; 280/150F, 150C; 293/60, 61, 64

[56] References Cited
UNITED STATES PATENTS

| 1,473,956 | 11/1923 | Eyre........................... | 293/61X |
| 2,441,132 | 2/1961 | Blakey........................ | 280/150X |
| 2,970,662 | 2/1961 | Hetteen....................... | 180/5 |

OTHER REFERENCES
The 1968 Huslter - Advertizing brochure published for Motrak Corporation - Minneapolis Minn. received in Patent Office Aug. 1, 1967

*Primary Examiner*—Richard J. Johnson
*Attorney*—A. F. Baillio

ABSTRACT: A shield for protecting self-propelled vehicles, particularly off-the-road vehicles, and their occupants from damage or injury in the event of collision with an obstacle, which includes a reticular enclosure for the front, lateral and upper sides of the forward portion of the vehicle.

PATENTED JAN 5 1971
3,552,514
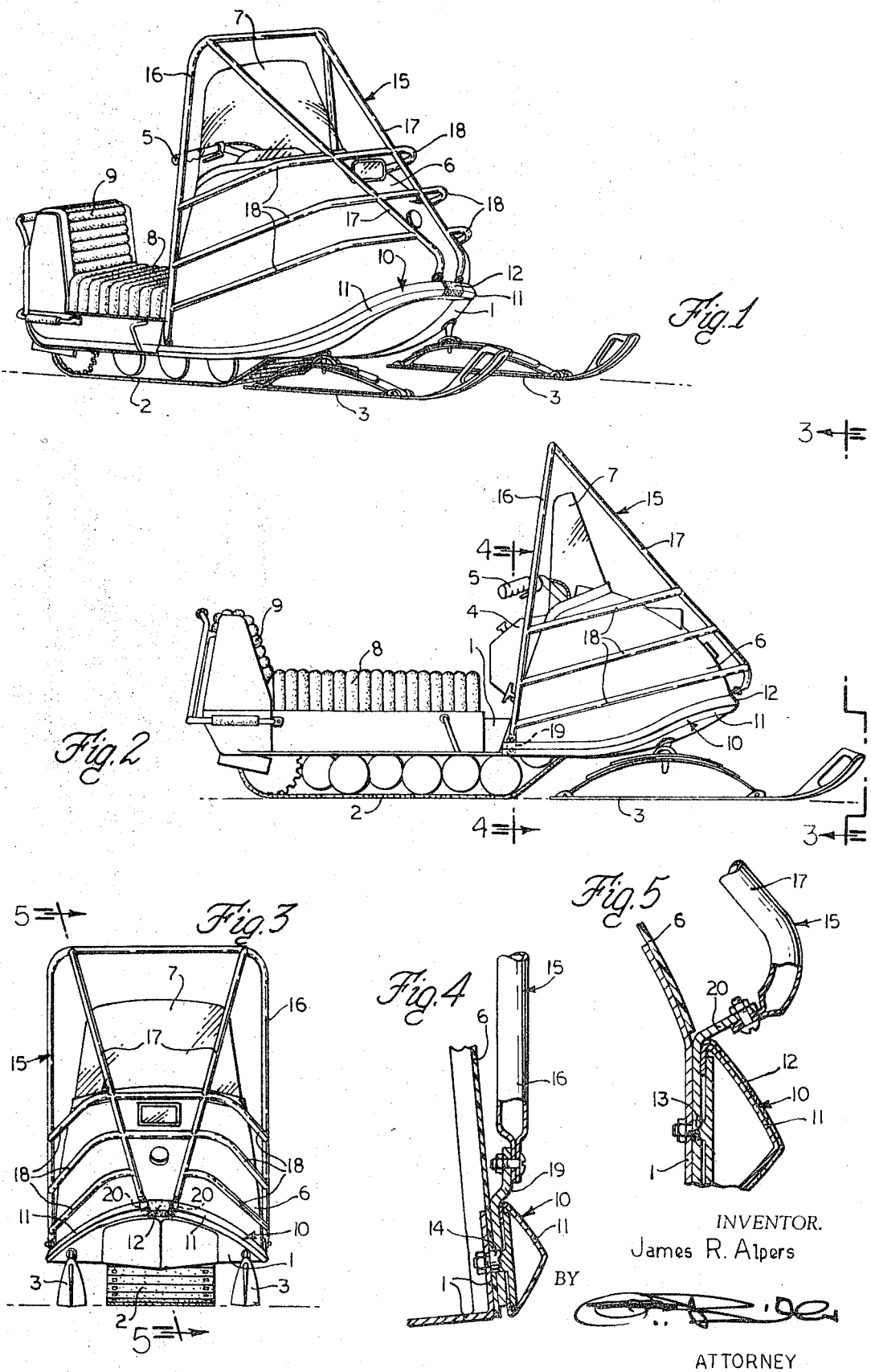
INVENTOR.
James R. Alpers
BY
ATTORNEY

RETICULAR SHIELD FOR VEHICLES

BACKGROUND OF INVENTION

This invention relates to self-propelled vehicles, particularly off-the-road vehicles, such as snowmobiles, which travel over rural and wooded country in which obstacles such as trees, brush, rocks and fences may be encountered unexpectedly.

The prior art, of course, contains various types of protective devices for vehicles and their occupants but none that are capable of dealing adequately with obstacles of the kind I have referred to. The Palis U.S. Pat. No. 1,107,832, Aug. 18, 1914, and the Burke U.S. Pat. No. 2,529,998, Nov. 14, 1950, are, I think, the most relevant.

SUMMARY OF INVENTION

The object of the invention is to provide a shield which will protect the vehicle and its occupants from damage or injury as a result of collision with obstacles such as I have mentioned without materially obstructing the vision of the occupants or limiting access of air and light to them. This is accomplished by providing a reticular structure which extends from the lower front portion of the vehicle upwardly and laterally rearwardly so as to provide a cagelike enclosure for the front portion of the vehicle which will brush aside or upwardly obstacles which can be deflected relatively easily, such as branches, brush and fences and reduce the effect on the vehicle and the occupants of collision with relatively immovable obstacles such as trees and rocks.

For a better understanding of the nature of the invention and a disclosure of the preferred embodiment thereof, reference is made to the accompanying drawing and the following description:

BRIEF DESCRIPTION OF THE DRAWING

FIG. 1 is a front diagonal view of a snowmobile equipped with a shield in accordance with my invention.

FIGS. 2 and 3 are, respectively, side and front elevations of the snowmobile shown in FIG. 1.

FIGS. 4 and 5 are fragmentary views on the lines 4–4 of FIG. 2 and 5–5 of FIG. 3, respectively.

DESCRIPTION OF PREFERRED EMBODIMENT

The vehicle shown in the drawing includes a steel frame 1 supported by a propelling track 2 and steering skis 3. The track is driven by an engine 4 mounted on the frame near its forward end and the skis are angularly movable by handle bars 5 to control the direction of travel of the vehicle.

The engine 4 is housed in a plastic hood 6 which is mounted on the frame 1 and on whose upper edge is mounted a clear flexible plastic windshield 7. Behind the engine, there is mounted on the frame a seat cushion 8 and a seat back 9 for the driver and any other occupants of the vehicle.

A bumper 10 extends around the front of the vehicle from the rear edge at one side to the rear edge at the other side of the hood. The bumper is made in two sections 11 which meet at the front of the vehicle and whose adjacent ends are bridged by a rubber member 12. The bumper is located at the level of the lower edge of the hood and is secured to the frame by a bolt 13 near the front end and bolt 14 near the rear end of each of the sections 11.

To protect the vehicle and its occupants from damage or injury as a result of collision with obstacles which the vehicle may encounter, such as trees, brush, rocks and fences, there is provided a reticular shield 15 which engages the hood from the frame to above the windshield and from the front of the vehicle to the rear edge of the hood or farther, if necessary, to adequately protect the occupants of the vehicle.

The shield 15 includes a tubular arch 16 which straddles the vehicle at the rear edge of the hood and extends from the frame 1 upwardly to the rear of and above the windshield 7. From the loop of the arch near its junction with the legs, there extend forwardly and downwardly convergingly to lower part of the front end of the vehicle at a distance from the windshield 7 and the hood 6 a pair of tubes 17.

From each of the tubes 17, tubes 18 extend outwardly, rearwardly and downwardly to the leg of the arch 16 on the same side of the vehicle at a distance forwardly and laterally from the hood. Where the distance between the tubes 17 is great enough to justify it, the tubes 18 also bridge the space between the tubes 17. These bridging elements of the tubes 18 may be made in one piece with the other portions of the tubes or as separate pieces.

The tubes 17 are, of course, secured by welding or otherwise to the tubular arch 16 at their junctions therewith and the tubes 18 are also secured by welding or otherwise to the legs of the tubular arch and the tubes 17 at their junctions therewith.

To secure the shield 15 to the vehicle there is provided a steel strap 19 which is secured to the lower end of each of the legs of the tubular arch 16 and a steel strap 20 which is secured to the lower, forward end of each of the tubes 17. The lower ends of the straps 19 and 20 extend between the bumper 10 and the frame of the vehicle at the front and rear ends of the sections 11 and are secured to the frame by the bolts 13 and 14, respectively.

The shield 15 will wedge aside or upwardly depending on their location the more easily deflective obstacles such as branches, brush and wire fences with which the vehicle may collide and thus protect the vehicle and its occupants from them without obstructing access of light and air to the occupants. Of course, if the vehicle collides with a relatively immovable obstacle, such as a tree or a rock, the shield will tend to deflect the vehicle away from it and reduce the effect of the impact on the vehicle and its occupants.

I claim:

1. In a self-propelled snow vehicle which includes a frame, front steering skis, a cowl mounted on the forward end of the frame, a windshield on the cowl, and occupant accommodations immediately to the rear of the cowl: a shield for the cowl and the occupant which consists of a structure laterally trianguloid in profile which extends upwardly and rearwardly from the forward end of the vehicle to and terminates above the windshield at the forward end of the occupant accommodations and is wholly self-supported and thus leaves the accommodations readily laterally accessible and includes an arch comprising upwardly extending legs connected by a bight which straddles and is mounted on and secured to the frame at the rear end of the cowl and defines the rear side of the structure, laterally spaced rods which extend forwardly, downwardly and convergingly from near the junctions of the legs and the bight of the arch to the frame at the forward end of the vehicle near its center and are mounted on and secured to both and thus define the inclined side of the structure, and a member which extends rearwardly and laterally between the lower portions of each of the first mentioned rods and the leg of the arch on the same side of the vehicle above the lower ends thereof and forms with the arch and the first mentioned rods a reticular structure which is self-sustaining with respect to rearwardly and laterally directed forces.

2. The self-propelled vehicle claimed in claim 1 in which each of the rearwardly and laterally extending members consists of a plurality of vertically spaced rods.

3. In a self-propelled snow vehicle which includes a frame, front steering skis, a cowl mounted on the forward end of the frame, a windshield on the cowl, and occupant accommodations immediately to the rear of the cowl: a shield for the cowl and the occupant which consists of a structure laterally trianguloid in profile which extends upwardly and rearwardly from the forward end of the vehicle to and terminates above the windshield at the forward end of the occupant accommodations and is wholly self-supported and thus leaves the accommodations readily laterally accessible and includes an arch comprising upwardly extending legs connected by a bight which straddles and is mounted on and secured to the frame at the rear end of the cowl and defines the rear side of the structure, a member which extends forwardly and downwardly from near the top of the arch to the frame at the forward end of the vehicle near its center and is mounted on and secured to both and thus define the inclined side of the structure, and a member which extends rearwardly and laterally between the lower portions of the first mentioned member and each leg of the arch above the lower ends thereof and forms with the arch and the first mentioned member a reticular structure which is self-sustaining with respect to rearwardly and laterally directed forces.

4. The self-propelled vehicle claimed in claim 3 in which each of the rearwardly and laterally extending members consists of a plurality of vertically spaced rods.

UNITED STATES PATENT OFFICE
CERTIFICATE OF CORRECTION

Patent No. 3,552,514　　　　　　　　　　　Dated　　January 5, 1971

Inventor(s)　James R. Alpers

It is certified that error appears in the above-identified patent and that said Letters Patent are hereby corrected as shown below:

Column 1, line 67, "engages" should read -- encages --.

Signed and sealed this 25th day of May 1971.

(SEAL)
Attest:

EDWARD M. FLETCHER, JR.　　　　　　　　　WILLIAM E. SCHUYLER, JR
Attesting Officer　　　　　　　　　　　　Commissioner of Patents